US009577932B2

(12) United States Patent
Ravipati et al.

(10) Patent No.: US 9,577,932 B2
(45) Date of Patent: Feb. 21, 2017

(54) TECHNIQUES FOR MANAGING TERNARY CONTENT-ADDRESSABLE MEMORY (TCAM) RESOURCES IN HETEROGENEOUS SYSTEMS

(71) Applicant: Brocade Communications Systems, Inc., San Jose, CA (US)

(72) Inventors: Anil Kumar Ravipati, Cupertino, CA (US); Prabhat Singh, Sunnyvale, CA (US); Chirdeep Panduranga, Bangalore (IN); Prateek Tambi, Bangalore (IN)

(73) Assignee: Brocade Communications Systems, Inc., San Jose, CA (US)

( * ) Notice: Subject to any disclaimer, the term of this patent is extended or adjusted under 35 U.S.C. 154(b) by 114 days.

(21) Appl. No.: 14/530,193

(22) Filed: Oct. 31, 2014

(65) Prior Publication Data

US 2015/0229565 A1     Aug. 13, 2015

Related U.S. Application Data

(60) Provisional application No. 61/938,805, filed on Feb. 12, 2014.

(51) Int. Cl.
*G06F 12/00* (2006.01)
*H04L 12/743* (2013.01)
(Continued)

(52) U.S. Cl.
CPC ......... *H04L 45/7457* (2013.01); *G06F 3/0631* (2013.01); *G06F 12/0292* (2013.01);
(Continued)

(58) Field of Classification Search
CPC .. G06F 3/0631; G06F 12/0292; G06F 12/064; G06F 12/0871; G06F 12/1081; G06F 13/0631; H04L 45/7457
(Continued)

(56) References Cited

U.S. PATENT DOCUMENTS 4,625,308 A    11/1986  Kim et al.
5,481,073 A    1/1996   Singer et al.
(Continued)

FOREIGN PATENT DOCUMENTS

EP    2924927 A1    9/2015
WO    2015026950 A1    2/2015

OTHER PUBLICATIONS

"Associative ternary cache for IP routing", Rooney et al., IEEE, pp. 409-416, 2004.*
(Continued)

*Primary Examiner* — Reba I Elmore
(74) *Attorney, Agent, or Firm* — Fountainhead Law Group P.C.

(57) ABSTRACT

Techniques for managing ternary content-addressable memory (TCAM) in a network device/system are provided. In one embodiment, the network device/system can include one or more TCAMs and can execute a TCAM manager for each TCAM. Each TCAM manager can manage allocation of resources of its associated TCAM, as well as manage access to the TCAM by one or more network applications running on the device/system. In this way, the TCAM managers can hide TCAM implementation differences (e.g., different sizes, different capabilities, etc.) from the network applications and thereby enable the applications to interact with the TCAMs in a uniform manner.

18 Claims, 4 Drawing Sheets

(51) Int. Cl.
*G06F 12/02* (2006.01)
*G06F 12/08* (2016.01)
*G06F 13/38* (2006.01)
*G06F 12/10* (2016.01)
*G06F 3/06* (2006.01)

(52) U.S. Cl.
CPC ...... *G06F 12/0871* (2013.01); *G06F 12/1081* (2013.01); *G06F 13/38* (2013.01)

(58) Field of Classification Search
USPC ...... 711/108, 151, 158, 216; 710/10, 26, 46, 710/243, 310; 712/200, 224
See application file for complete search history.

(56) References Cited

U.S. PATENT DOCUMENTS

| | | | |
|---|---|---|---|
| 5,651,003 | A | 7/1997 | Pearce et al. |
| 6,243,756 | B1 | 6/2001 | Whitmire et al. |
| 6,366,582 | B1 | 4/2002 | Nishikado et al. |
| 6,373,840 | B1 | 4/2002 | Chen |
| 6,490,276 | B1 | 12/2002 | Salett et al. |
| 6,496,502 | B1 | 12/2002 | Fite, Jr. et al. |
| 6,516,345 | B1 | 2/2003 | Kracht |
| 6,526,345 | B2 | 2/2003 | Ryoo |
| 6,597,658 | B1 | 7/2003 | Simmons |
| 6,725,326 | B1* | 4/2004 | Patra ............ G06F 12/023 2/23 |
| 6,765,877 | B1 | 7/2004 | Foschiano et al. |
| 6,807,182 | B1 | 10/2004 | Dolphin et al. |
| 6,839,342 | B1 | 1/2005 | Parham et al. |
| 6,839,349 | B2 | 1/2005 | Ambe et al. |
| 7,093,027 | B1 | 8/2006 | Shabtay et al. |
| 7,099,315 | B2 | 8/2006 | Ambe et al. |
| 7,106,736 | B2 | 9/2006 | Kalkunte |
| 7,136,289 | B2 | 11/2006 | Vasavda et al. |
| 7,184,441 | B1 | 2/2007 | Kadambi et al. |
| 7,206,283 | B2 | 4/2007 | Chang et al. |
| 7,206,309 | B2 | 4/2007 | Pegrum et al. |
| 7,274,694 | B1 | 9/2007 | Cheng et al. |
| 7,313,667 | B1* | 12/2007 | Pullela ............ H04L 49/3009 370/395.32 |
| 7,327,727 | B2* | 2/2008 | Rich ............ H04L 45/00 370/382 |
| 7,336,622 | B1 | 2/2008 | Fallis et al. |
| 7,426,179 | B1 | 9/2008 | Harshavardhana et al. |
| 7,480,258 | B1 | 1/2009 | Shuen et al. |
| 7,496,096 | B1 | 2/2009 | Dong et al. |
| 7,523,227 | B1* | 4/2009 | Yager ............ G06F 13/28 370/232 |
| 7,565,343 | B2* | 7/2009 | Watanabe ............ H04L 45/745 |
| 7,602,787 | B2* | 10/2009 | Cheriton ............ G06F 17/30949 370/392 |
| 7,697,419 | B1 | 4/2010 | Donthi |
| 7,933,282 | B1* | 4/2011 | Gupta ............ G06F 17/30982 370/412 |
| 8,209,457 | B2 | 6/2012 | Engel et al. |
| 8,307,153 | B2* | 11/2012 | Kishore ............ H04L 45/7457 710/56 |
| 8,750,144 | B1* | 6/2014 | Zhou ............ H04L 45/54 370/252 |
| 8,949,574 | B2* | 2/2015 | Slavin ............ 711/108 |
| 9,032,057 | B2 | 5/2015 | Agarwal et al. |
| 9,148,387 | B2 | 9/2015 | Lin et al. |
| 9,185,049 | B2 | 11/2015 | Agarwal et al. |
| 9,269,439 | B1* | 2/2016 | Levy ............ G11C 15/00 |
| 9,282,058 | B2 | 3/2016 | Lin et al. |
| 9,313,102 | B2 | 4/2016 | Lin et al. |
| 2001/0042062 | A1 | 11/2001 | Tenev et al. |
| 2002/0046271 | A1 | 4/2002 | Huang |
| 2002/0101867 | A1 | 8/2002 | O'Callaghan et al. |
| 2003/0005149 | A1 | 1/2003 | Haas et al. |
| 2003/0169734 | A1 | 9/2003 | Lu et al. |
| 2003/0174719 | A1 | 9/2003 | Sampath et al. |
| 2003/0188065 | A1 | 10/2003 | Golla et al. |
| 2005/0063354 | A1 | 3/2005 | Garnett et al. |
| 2005/0141513 | A1* | 6/2005 | Oh ............ H04L 45/00 370/395.3 |
| 2005/0198453 | A1 | 9/2005 | Osaki |
| 2005/0243739 | A1* | 11/2005 | Anderson ............ H04L 29/12009 370/254 |
| 2005/0271044 | A1 | 12/2005 | Hsu et al. |
| 2006/0013212 | A1 | 1/2006 | Singh et al. |
| 2006/0023640 | A1 | 2/2006 | Chang et al. |
| 2006/0072571 | A1 | 4/2006 | Navada et al. |
| 2006/0077910 | A1 | 4/2006 | Lundin et al. |
| 2006/0080498 | A1* | 4/2006 | Shoham ............ G11C 15/00 711/108 |
| 2006/0092849 | A1 | 5/2006 | Santoso et al. |
| 2006/0092853 | A1 | 5/2006 | Santoso et al. |
| 2006/0176721 | A1* | 8/2006 | Kim ............ G11C 15/00 365/49.16 |
| 2006/0187900 | A1 | 8/2006 | Akbar |
| 2006/0253557 | A1 | 11/2006 | Talayco et al. |
| 2006/0280125 | A1 | 12/2006 | Ramanan et al. |
| 2006/0294297 | A1* | 12/2006 | Gupta ............ G11C 15/00 711/108 |
| 2007/0081463 | A1 | 4/2007 | Bohra et al. |
| 2007/0121673 | A1 | 5/2007 | Hammer |
| 2007/0174537 | A1* | 7/2007 | Kao ............ G11C 15/00 711/5 |
| 2008/0137530 | A1 | 6/2008 | Fallis et al. |
| 2008/0192754 | A1* | 8/2008 | Ku ............ H04L 45/00 370/395.32 |
| 2008/0281947 | A1 | 11/2008 | Kumar |
| 2009/0125617 | A1 | 5/2009 | Klessig et al. |
| 2009/0135715 | A1 | 5/2009 | Bennah |
| 2009/0141641 | A1 | 6/2009 | Akahane et al. |
| 2010/0172365 | A1 | 7/2010 | Baird et al. |
| 2010/0182933 | A1 | 7/2010 | Hu et al. |
| 2010/0185893 | A1 | 7/2010 | Wang et al. |
| 2010/0257283 | A1 | 10/2010 | Agarwal |
| 2010/0284414 | A1 | 11/2010 | Agarwal et al. |
| 2010/0293200 | A1 | 11/2010 | Assarpour |
| 2010/0329111 | A1 | 12/2010 | Wan et al. |
| 2011/0238923 | A1 | 9/2011 | Hooker et al. |
| 2011/0268123 | A1* | 11/2011 | Kopelman ............ H04L 69/22 370/392 |
| 2012/0020373 | A1 | 1/2012 | Subramanian et al. |
| 2012/0087232 | A1 | 4/2012 | Hanabe et al. |
| 2012/0155485 | A1 | 6/2012 | Saha et al. |
| 2012/0246400 | A1* | 9/2012 | Bhadra ............ H04L 49/3009 711/104 |
| 2013/0170495 | A1* | 7/2013 | Suzuki ............ H04L 49/3009 370/392 |
| 2013/0201984 | A1 | 8/2013 | Wang |
| 2013/0215791 | A1 | 8/2013 | Lin et al. |
| 2013/0232193 | A1 | 9/2013 | Ali et al. |
| 2013/0262377 | A1 | 10/2013 | Agarwal |
| 2014/0003228 | A1 | 1/2014 | Shah et al. |
| 2014/0006706 | A1* | 1/2014 | Wang ............ H04L 49/901 711/108 |
| 2014/0071985 | A1* | 3/2014 | Kompella ............ H04L 41/5019 370/389 |
| 2014/0075108 | A1* | 3/2014 | Dong ............ H04L 12/6418 711/108 |
| 2014/0112190 | A1 | 4/2014 | Chou et al. |
| 2014/0112192 | A1 | 4/2014 | Chou et al. |
| 2014/0122791 | A1* | 5/2014 | Fingerhut ............ H04L 49/00 711/108 |
| 2014/0126354 | A1 | 5/2014 | Hui et al. |
| 2014/0153573 | A1 | 6/2014 | Ramesh et al. |
| 2014/0181275 | A1 | 6/2014 | Lin et al. |
| 2014/0269402 | A1 | 9/2014 | Vasseur et al. |
| 2014/0314082 | A1 | 10/2014 | Korpinen et al. |
| 2014/0334494 | A1 | 11/2014 | Lin et al. |
| 2014/0341079 | A1 | 11/2014 | Lin et al. |
| 2014/0341080 | A1 | 11/2014 | Lin et al. |
| 2014/0376361 | A1 | 12/2014 | Hui et al. |
| 2015/0016277 | A1 | 1/2015 | Smith et al. |
| 2015/0036479 | A1 | 2/2015 | Gopalarathnam |
| 2015/0055452 | A1 | 2/2015 | Lee |

(56) References Cited

U.S. PATENT DOCUMENTS

| | | | |
|---|---|---|---|
| 2015/0117263 A1 | 4/2015 | Agarwal et al. |
| 2015/0124826 A1 | 5/2015 | Edsall et al. |
| 2015/0281055 A1 | 10/2015 | Lin et al. |
| 2015/0288567 A1 | 10/2015 | Lin et al. |
| 2016/0028652 A1 | 1/2016 | Agarwal et al. |
| 2016/0173332 A1 | 6/2016 | Agarwal et al. |
| 2016/0173339 A1 | 6/2016 | Lin et al. |

OTHER PUBLICATIONS

"Starburst: Building Next-Generation Internet Devices", Sharp et al., Bell Labs Technical Journal, Lucent Technologies, Inc., pp. 6-17, 2002.*
Amendment to Carrier Multiple Access with Collision Detection (CSMA/CD Access Method and Physical Layer Specifications—Aggregation of Multi[ple Link Segments; IEEE Std. 802.3ad; 2000; 183 pages.
Appeal Brief Dated Jan. 18, 2013; U.S. Appl. No. 12/463,964 (23p.).
Brocade: "FastIron Ethernet Switch"; Administration Guide; Supporting FastIron Software Release 08.0.00; Apr. 30, 2013; 400 pages.
Brocade: "FastIron Ethernet Switch"; IP Multicast Configuration Guide; Supporting FastIron Software Release 08.0.00; Apr. 30, 2013; 212 pages.
Brocade: "FastIron Ethernet Switch"; Stacking Configuration Guide; Supporting FastIron Software Release 08.0.00; Apr. 30, 2013; 170 pages.
Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/Technology_White_Paper/200812/623012_57_0.htm.
Examiner's Answer Dated May 7, 2013; U.S. Appl. No. 12/463,964 (12 p.).
Extreme Networks Technical Brief: "SummitStack Stacking Technology"; 1346_06; Dec. 2010; 8 pages.
Final Office Action Dated Jan. 23, 2012; U.S. Appl. No. 12/463,964 (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.
Juniper Networks datasheet entitled: "Juniper Networks EX 4200 Ethernet Switches with Virtual Chassis Technology"; Dated Aug. 2013 (12 p.).
Understanding and Configuring the Undirectional Link Detection Protocol Feature; Cisco support communication; Jul. 9, 2007; Document ID No. 10591; 5 pages; http://www.cisco.com/c/en/us/support/docs/lan-switching/spanning-tree-protocol/10591-77.html.
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.

Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (10 P.).
Partial International Search Report for PCT/US2014/051903 dated Nov. 18, 2014.
Reply Brief Dated Jul. 8, 2013; U.S. Appl. No. 12/463,964 (14 p.).
Response to Office Action Dated Mar. 21, 2011; U.S. Appl. No. 12/463,964; Response filed Sep. 21, 2011 (12 p.).
Suckfuell: "Evolution of EWSD During the Eighties"; Institute of Electrical and Electronics Engineers; Global Telecommunications Conference; San Diego; Nov. 28-Dec 1, 1983; [Global Telecommunications Conference], New York, IEEE, US, vol. 2, Nov. 1, 1983; pp. 577-581.
U.S. Appl. No. 14/106,302, filed Dec. 13, 2013 by Lin et al.
U.S. Appl. No. 14/207,146, filed Mar. 12, 2014 by Lin et al.
U.S. Appl. No. 14/094,931, filed Dec. 3, 2013 by Lin et al.
U.S. Appl. No. 14/268,507, filed May 2, 2014 by Agarwal. (Unpublished).
U.S. Appl. No. 14/171,152, filed Feb. 3, 2014 by Lin et al.
U.S. Appl. No. 14/485,343, filed Sep. 12, 2014 by Lin et al.
U.S. Appl. No. 14/506,943, filed Oct. 6, 2014 by Lin et al.
U.S. Appl. No. 14/463,419, filed Aug. 19, 2014 by Lee.
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982 filed on Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
U.S. Appl. No. 61/974,924, filed Apr. 3, 2014 by Lin et al.
Notice of Allowance dated Dec. 14, 2015; U.S. Appl. No. 14/094,931 (25 pgs.).
U.S. Appl. No. 14/869,743, filed Sep. 29, 2015 by Agarwal et al.
U.S. Appl. No. 62/092,617, filed Dec. 16, 2014 by Agarwal et al.
Office Action Dated Feb. 18, 2016; U.S. Appl. No. 14/463,419; (74 pgs.).
Office Action Dated Feb. 23, 2016; U.S. Appl. No. 14/171,152; (61 pgs.).
Office Action Dated Apr. 29, 2016; U.S. Appl. No. 14/485,343; (72 pgs.).
Final Office Action Dated Jun. 3, 2016; U.S. Appl. No. 14/106,302; (35 pgs.).
Office Action Dated Jul. 16, 2015; U.S. Appl. No. 14/094,931; (41 pgs.).
Extended European Search Report dated Jul. 30, 2015 for EP Appln. 15000834.0; 8 pages.
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Notice of Allowance dated Aug. 3, 2015; U.S. Appl. No. 14/207,146 (38 pgs.).
Notice of Allowance dated Sep. 17, 2015; U.S. Appl. No. 14/268,507 (15 pgs.).
Notice of Allowance dated Oct. 30, 2015; U.S. Appl. No. 13/850,118 (12 pgs.).
Response to Office Action Dated Jul. 16, 2015; U.S. Appl. No. 14/094,931; Response filed Nov. 12, 2015 (13 p.).
Office Action Dated Nov. 20, 2015; U.S. Appl. No. 14/106,302; (14 pgs.).
International Search Report and Written Opinion for International Appln. No. PCT/US2014/051903 dated Jan. 27, 2015, 16 pages.
Final Office Action Dated Feb. 13, 2015; U.S. Appl. No. 13/850,118; (14 p.).
U.S. Appl. No. 14/876,639, filed Oct. 6, 2015 by Agarwal et al.
Notice of Allowance Dated Oct. 13, 2016; U.S. Appl. No. 14/106,302; (23 pgs.).

(56) References Cited

OTHER PUBLICATIONS

Final Office Action Dated Aug. 24, 2016; U.S. Appl. No. 14/171,152; (39 pgs.).
NonFinal Office Action Dated Nov. 9, 2016; U.S. Appl. No. 14/506,943; (18 pgs.).
Final Office Action Dated Nov. 1, 2016; U.S. Appl. No. 14/485,343; (31 pgs.).
NonFinal Office Action Dated Jul. 13, 2016; U.S. Appl. No. 14/876,639; (69 pgs.).

* cited by examiner

TECHNIQUES FOR MANAGING TERNARY CONTENT-ADDRESSABLE MEMORY (TCAM) RESOURCES IN HETEROGENEOUS SYSTEMS

CROSS REFERENCES TO RELATED APPLICATIONS

The present application claims the benefit and priority under 35 U.S.C. 119(e) of U.S. Provisional Application No. 61/938,805, filed Feb. 12, 2014, entitled "A UNIFIED METHOD FOR MANAGING TERNARY CONTENT ADDRESSABLE MEMORY ACROSS HETEROGENEOUS DEVICES." The entire contents of this provisional application are incorporated herein by reference for all purposes.

BACKGROUND

A ternary content-addressable memory (TCAM) is a type of memory that is commonly incorporated in, or packaged with, packet processors used by network devices and systems. The packet processors leverage the TCAMs to perform fast lookups of patterns in sent/received packets and to apply actions to the packets (e.g., drop, forward to address X, etc.) based on the lookups. Some network devices/systems, referred to herein as "homogeneous" devices/systems, make use of packet processors that all have the same type of TCAM. For instance, in a homogeneous device/system, the included TCAMs may all be instances of the same TCAM module designed by the same chip vendor. Other network devices/systems, referred to herein as "heterogeneous" devices/systems, make use of packet processors that have different types of TCAMs. For instance, in a heterogeneous device/system (such as, e.g., a mixed stacking system), the included TCAMs may correspond to different TCAM modules designed by different chip vendors (or different TCAM modules designed by the same chip vendor).

One challenge with managing the different types of TCAMs in a heterogeneous network device/system is that the TCAMs may support different memory sizes and/or different capabilities. For example, consider a stacking system comprising a mixture of high-end stackable switches S1, S2 and low-end stackable switches S3, S4, S5. Each of these switches includes a TCAM T1, T2, T3, T4, and T5 respectively. In this scenario, TCAMs T1 and T2 (which correspond to high-end stackable switches S1 and S2) may be larger in size that TCAMs T3, T4, and T5 (which correspond to low-end stackable switches S3-S5). Alternatively or in addition, the capabilities of each TCAM (e.g., accessibility method, support for hardware priority, etc.) may differ. This makes it difficult for network applications running on the stacking system to manage and interact with the TCAMs in a uniform manner.

SUMMARY

Techniques for managing TCAM resources in a network device/system are provided. In one embodiment, the network device/system can include one or more TCAMs and can execute a TCAM manager for each TCAM. Each TCAM manager can manage allocation of resources of its associated TCAM, as well as manage access to the TCAM by one or more network applications running on the device/system. In this way, the TCAM managers can hide TCAM implementation differences (e.g., different sizes, different capabilities, etc.) from the network applications and thereby enable the applications to interact with the TCAMs as if they were identical modules.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for managing TCAM resources in a network device or system that comprises multiple TCAMs. According to one set of embodiments, the network device/system can execute a separate TCAM manager for each TCAM of the system. Each TCAM manager is a software component that runs on, e.g., a management CPU of the device/system and is configured to (1) manage allocation of resources (i.e., table space) within its associated TCAM, and (2) manage access to the TCAM by various network applications (security protocols, routing protocols, etc.) running on the device/system. By acting as an intermediary layer between the network applications and the TCAMs, these TCAM managers can effectively abstract away the hardware implementation of each TCAM (e.g., size, capabilities, etc.) and present a uniform TCAM interaction interface to the network applications. This, in turn, allows the network applications to code their TCAM operations (e.g., rule programming, rule matching, etc.) in a unified manner, without having to worry about the specific feature set supported by each different type of TCAM.

Embodiments of the present invention are particularly beneficial for heterogeneous network devices/systems (i.e., devices/systems comprising different types of TCAMs), such as mixed stacking systems or modular chassis systems. However, the techniques described herein may also be applied to homogeneous network devices/systems (i.e., devices/systems comprising a single type of TCAM). In this latter case, these techniques can facilitate device/system engineering and development—for example, if the TCAMs in the device/system are later replaced within a newer TCAM module in a newer revision, no changes will be needed to the application layer that interacts with the TCAMs (since they are coded to interact with the generic TCAM managers, rather than with an access interface that is specific to a particular TCAM module).

2. System Environment

Figure 1:
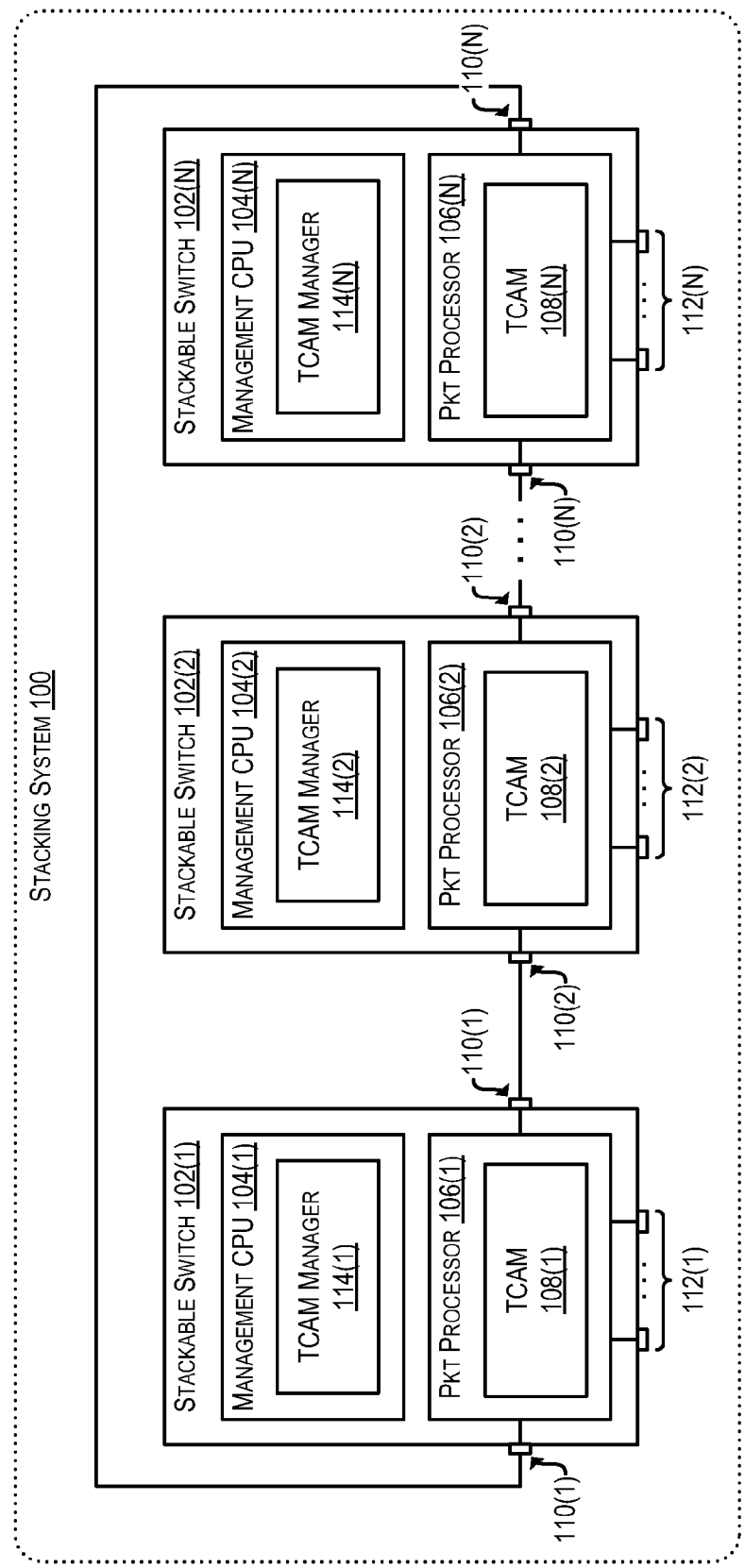
FIG. 1 depicts a system environment according to an embodiment.

FIG. 1 depicts a stacking system 100 that supports the TCAM management techniques of the present invention according to an embodiment. Stacking system 100 is provided as one example of a network device or system that incorporates multiple TCAMs. It should be appreciated that other types of multi-TCAM devices/systems (e.g., a chassis system, etc.) may be used in place of stacking system 100 in FIG. 1.

As shown, stacking system 100 includes a number of stackable switches 102(1)-102(N) that are communicatively coupled via respective stacking ports 110(1)-110(N). Although stackable switches 102(1)-102(N) are depicted as forming a ring topology, other types of topologies (e.g., linear, star, arbitrary mesh, etc.) are also possible. Each stackable switch 102(1)-102(N) comprises a management CPU 104(1)-104(N) that is responsible for handling the control plane and management functions of switch 102(1)-102(N). In addition, each stackable switch 102(1)-102(N) comprises a packet processor 106(1)-106(N) that is responsible for handling some (or all) of the data plane functions of switch 102(1)-102(N).

To carry out its data plane functions, each packet processor 106(1)-106(N) includes a TCAM 108(1)-108(N), which packet processor 106(1)-106(N) leverages for various packet processing purposes. For instance, each packet processor 106(1)-106(N) can install rules (i.e., entries) in its corresponding TCAM for features such as, e.g., L3 routing, DHCP snooping, IP source guard, ICMP attack prevention, static ACLs, dynamic ACLs, and so on. Each rule can define an IP subnet or host address, as well as an action to take for a packet that matches the subnet/host address. Each packet processor 106(1)-106(N) can then process incoming packets (e.g., packets that are received via data ports 112(1)-112(N) and/or stacking ports 110(1)-110(N)) by performing a lookup into its TCAM 108(1)-108(N) for each packet and executing the associated action if a match is made. If no match is made for a given packet, packet processor 106(1)-106(N) can take a default action, such as dropping the packet or trapping it to management CPU 104(1)-104(N).

For the purposes of this example, it is assumed that TCAMs 108(1)-108(N) are heterogeneous; in other words, at least one of TCAMs 108(1)-108(N) has a size that is different from the other TCAMs, or supports a capability that is not supported by the other TCAMs. For instance, TCAM 108(1) may have more table entries than TCAMs 108(2)-108(N), and/or support dynamic hardware-based priority (or other capabilities) while TCAMs 108(2)-108(N) do not. This may occur if, e.g., the chipset of packet processor 106(1) is designed by a different chip vendor than the chipsets of packet processors 106(2)-106(N) (or is a different model/module designed by the same chip vendor).

As noted in the Background section, one difficulty with managing a heterogeneous network system such as stacking system 100 of FIG. 1 is that, due to the different potential hardware capabilities/sizes of TCAMs 108(1)-108(N), the network applications running on the system cannot interact with the TCAMs in a uniform manner. For example, if a DHCP snooping application were running on management CPUs 104(1)-104(N), the application would need to be aware of the various different sizes and capabilities of TCAMs 108(1)-108(N) and would need to implement specialized code paths in order to account for these differences when accessing the TCAMs. While this approach may be workable for fixed devices/systems, it quickly become unpractical in modular systems like stacking system 100 where devices (and thus TCAMs) can be added and removed from the system on-demand.

To address the foregoing and other similar issues, each management CPU 104(1)-104(N) of stacking system 100 is configured to execute a novel TCAM manager 114(1)-114(N) (one per TCAM 108(1)-108(N)). As described in further detail below, TCAM managers 114(1)-114(N) can act as an intermediary, or virtualization, layer between the network applications of stacking system 100 and TCAMs 108(1)-108(N), thereby hiding the hardware differences of TCAMs 108(1)-108(N) from the applications. For instance, if TCAM 108(1) supports dynamic hardware-based priority for rules while TCAMs 108(2)-108(N) do not, TCAM managers 114(1)-114(N) can present a single, unified TCAM programming interface to the network applications. TCAM managers 114(1)-114(N) can then internally determine how to install rules into their respective TCAMs based on the rule priorities and the hardware capabilities of each TCAM. In this way, the network applications can interact with TCAMs 108(1)-108(N) (via TCAM managers 114(1)-114(N)) as if they are all the same type of TCAM module, even though they are not.

2. TCAM Manager Architecture

Figure 2:
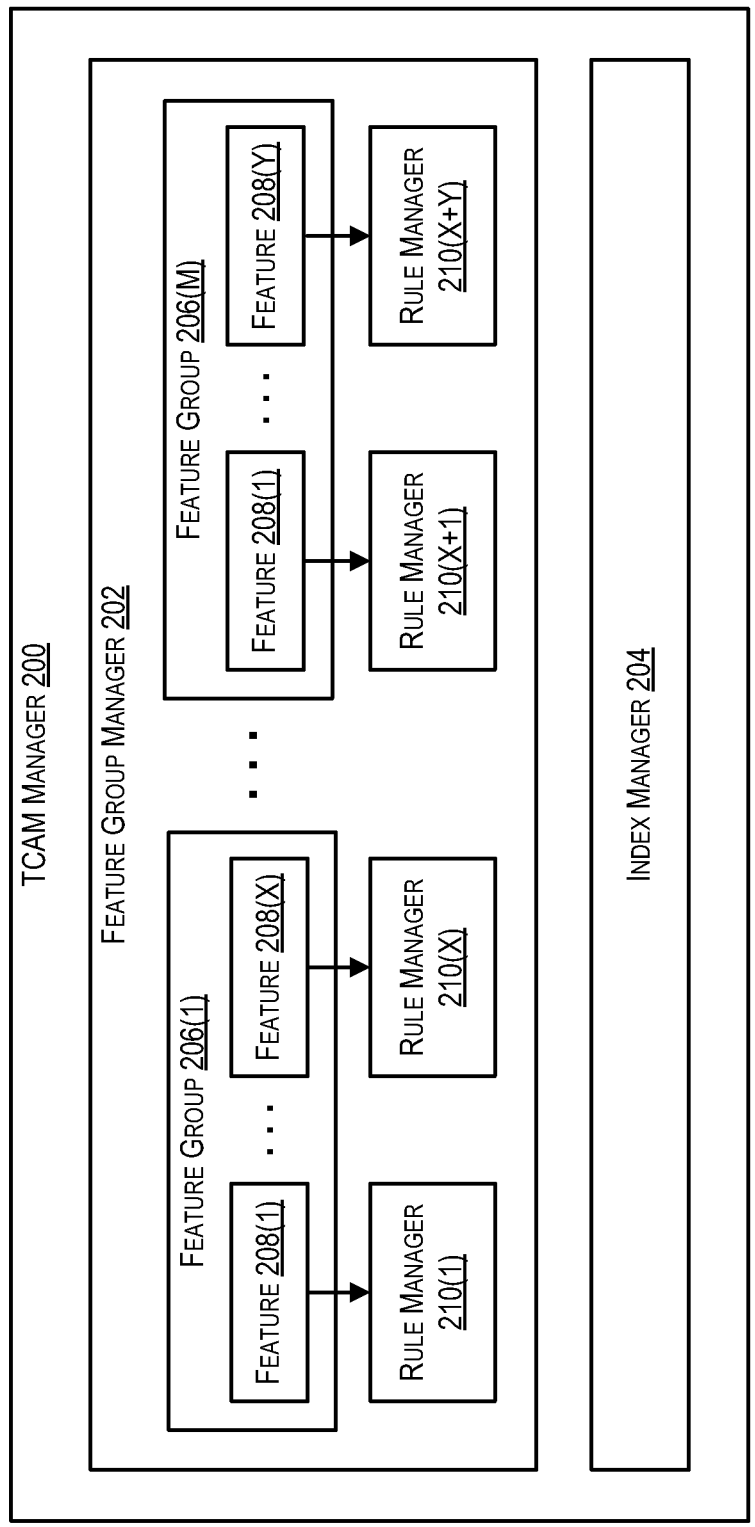
FIG. 2 depicts components of a TCAM manager according to an embodiment.

FIG. 2 depicts a simplified diagram of a TCAM manager 200 according to an embodiment. TCAM manager 200 can be used to implement TCAM managers 114(1)-114(N) of FIG. 1. As shown, TCAM manager 200 comprises a feature group manager 202 and an index manager 204. Feature group manager 202 has a number of functions. First, feature group manager 202 can group together various features that make use of the TCAM manager's corresponding TCAM (e.g., DHCP snooping, IP source guard, ICMP attack prevention, IPv4 ACLs, IPv6 ACLs, dynamic ACLs, etc.). For instance, in FIG. 2, feature group manager has created M feature groups (206(1)-206(M)), each including a number of features (208(1)-208(X) and 208(1)-208(Y)). In a particular embodiment, feature group manager 202 can perform this grouping based on a "priority" associated with each feature, where a higher priority indicates that the feature's rules should be matched before the rules of other features with lower priorities. In this manner, feature group manager 202 can determine where the rules for a particular feature should be installed in the TCAM (note that generally, rules with a lower index are matched before rules with a higher index).

Second, feature group manager 202 can (via a number of rule managers 210) keep track of mappings between the feature groups/features and where the rules for those feature groups/features are actually installed in the TCAM. For example, if there two rules for feature 208(1) installed at table indices 512 and 513 in the TCAM, rule manager 210(1) can maintain a mapping between feature 208(1) and indices 512 and 513. This allows TCAM manager 200 to quickly find all of the rules for a given feature group or feature, which can be useful if the rule needs to be deleted or modified. This also allows TCAM manager 200 to share a single rule entry for multiple different ports that may be configured to use the same feature or feature group (thereby saving TCAM space).

Index manager 204 works in conjunction with feature group manager 202 and manages the allocation of resources (i.e., entries) in the TCAM manager's corresponding TCAM. For instance, index manager 204 can divide the TCAM space into a number of partitions, where each partition is allocated to a feature group determined by feature group manager 202. This allows TCAM manager 200 to physically segregate the rules for different feature groups, which has several benefits. For example, TCAM manager 200 can ensure that higher priority feature groups are allocated partitions that have a lower index range than lower priority feature groups (thereby ensuring that the rules in the higher priority feature groups are matched first). Further by segregating different feature groups into different TCAM partitions, TCAM manager 200 can ensure that the addition or removal of rule(s) for one feature group will not affect the operation of features in other feature groups, since the partitions of those other feature groups will not need to be touched/modified.

Section 3 below provides additional details regarding the operation of feature group manager 202 and index manager 204 in a typical workflow.

3. Management Workflow

Figure 3:
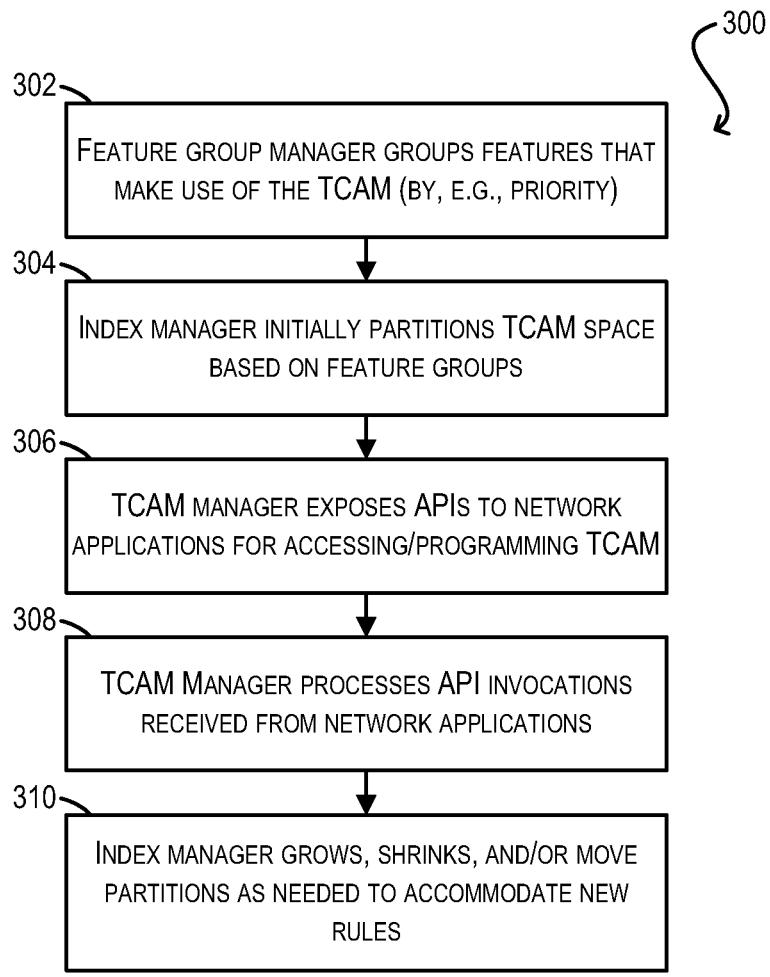
FIG. 3 depicts a management workflow that can be performed by a TCAM manager according to an embodiment.

FIG. 3 depicts a high-level management workflow 300 that can be performed by TCAM manager 200 for managing its corresponding TCAM according to an embodiment. Starting with block 302, feature group manager 202 of TCAM manager 200 can group together features that make use of the TCAM. As noted previously, in one embodiment, feature group manager 202 can perform this grouping based on feature priority, such that features with substantially the same priority are placed in the same feature group.

At block 304, index manager 204 of TCAM manager 200 can initially partition the space in the TCAM based on the feature groups created at block 302. For example, if feature group manager 202 created three feature groups, index manager 204 can divide the TCAM into three partitions and assign each feature group to a different partition. In a particular embodiment, index manager 204 can assign higher priority feature groups to partitions that have a lower TCAM index range and can assign lower priority feature groups to partitions that have a higher TCAM index range.

At block 306, TCAM manager can expose a number of application programming interfaces (APIs) to network applications running on the network system for accessing/programming the TCAM. As noted previously, these APIs can be uniform in nature, such that the various TCAM managers in the system will expose the same APIs, regardless of the underlying hardware sizes/capabilities of their corresponding TCAMs.

Then, at block 308, TCAM manager 200 can process API invocations received from the network applications. These API invocations may correspond to, e.g., programming a rule for a particular feature, modifying a rule, or deleting a rule. In the case of programming a rule, TCAM manager 200 can determine, based on the partitions created by index manager 204, which TCAM partition the rule should be placed in, and can install the rule into the determined partition. In the case of modifying or deleting a rule, TCAM manager 200 can determine, via an appropriate rule manager 210, where (i.e., at which hardware index) the rule is currently installed. TCAM manager 200 can then modify or delete the rule based on the determined hardware index. Significantly, since the rules are partitioned by feature group, the addition, modification, or deletion of a rule in one partition will generally not affect the operation of features in other partitions.

Finally, at block 310, index manager 204 can dynamically grow, shrink, and/or move TCAM partitions as needed in order to accommodate new rules. For instance, in a scenario where one partition becomes full, index manager 204 can grow that partition by a certain number of entries and shrink a neighboring partition. Index manager 204 can also move partitions if they cannot be shrunk. In a particular embodiment, index manager 204 can perform these operations using a "copy before move" paradigm, thereby ensuring that there is no traffic loss due to missing TCAM entries while partitions are being modified.

4. Example Network Switch/Router

Figure 4:
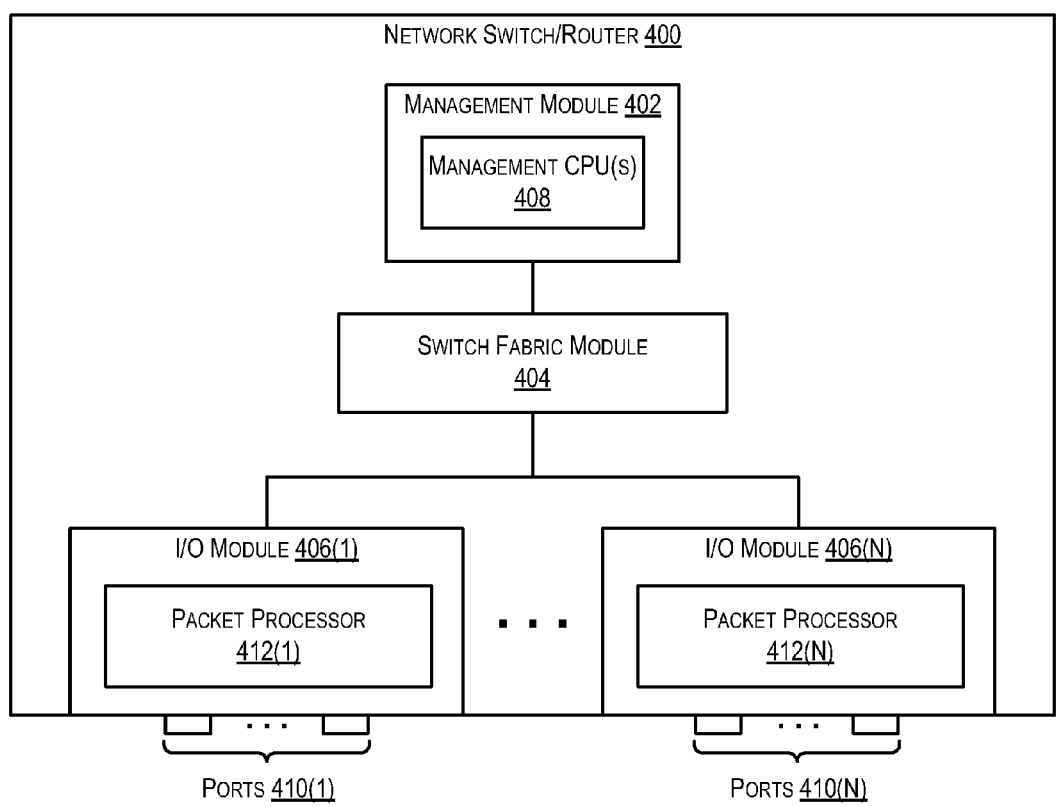
FIG. 4 depicts a network device according to an embodiment.

FIG. 4 is a simplified block diagram of an exemplary network switch/router 400 according to an embodiment. In certain embodiments, network switch/router 400 can be used to implement each stackable switch 102(1)-102(N) of FIG. 1.

As shown, network switch/router 400 includes a management module 402, a switch fabric module 404, and a number of I/O modules 406(1)-406(N). Management module 402 represents the control plane of network switch/router 400 and includes one or more management CPUs 408 for managing/controlling the operation of the device. Each management CPU 408 can be a general purpose processor, such as a PowerPC, Intel, AMD, or ARM-based processor, that operates under the control of software stored in an associated memory (not shown).

Switch fabric module 404 and I/O modules 406(1)-406(N) collectively represent the data, or forwarding, plane of network switch/router 400. Switch fabric module 404 is configured to interconnect the various other modules of network switch/router 400. Each I/O module 406(1)-406(N) can include one or more input/output ports 410(1)-410(N) that are used by network switch/router 400 to send and receive data packets. As noted with respect to FIG. 1, ports 410(1)-410(N) can comprise stacking ports for communicating with other stackable switches in the same stacking system, as well as data ports for communicating with host devices/networks. Each I/O module 406(1)-406(N) can also include a packet processor 412(1)-412(N). Packet processor 412(1)-412(N) is a hardware processing component (e.g., an FPGA or ASIC) that can make wire speed decisions on how to handle incoming or outgoing data packets. Although not shown, each packet processor 412(1)-412(N) can include a TCAM like TCAMs 108(1)-108(N) of FIG. 1 to facilitate its packet processing functions.

It should be appreciated that network switch/router 400 is illustrative and not intended to limit embodiments of the present invention. Many other configurations having more or fewer components than network switch/router 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A network system comprising:
   a first ternary content-addressable memory (TCAM) supporting one or more first hardware capabilities;
   a second TCAM supporting one or more second hardware capabilities that are not supported by the first TCAM;
   a processor; and
   a non-transitory computer readable storage medium having stored thereon instructions that, when executed by the processor, cause the processor to:
   execute a first TCAM manager associated with the first TCAM; and
   execute a second TCAM manager associated with the second TCAM, wherein each of the first and second TCAM managers:
   exposes, to a network application running on the network system, a unified application programming interface (API) for programming a rule into its associated TCAM, the unified API being identical for the first and second TCAM managers; and
   upon receiving an invocation of the unified API from the network application, determines how to program the rule based on its associated TCAM's supported hardware capabilities.

2. The network system of claim 1 wherein first TCAM has a different size than the second TCAM.

3. The network system of claim 1 wherein the one or more second hardware capabilities supported by the second TCAM include hardware-based prioritization of rules programmed into the second TCAM.

4. The network system of claim 3 wherein the first TCAM manager implements prioritization of rules programmed into the first TCAM by implementing:
   a feature group manager that groups together features that make use of the first TCAM based on feature priorities; and
   a rule manager that maintains mappings between the features and indices of rules that have been programmed into the first TCAM; and
   an index manager that allocates a portion of the first TCAM to each feature group that is determined by the feature group manager.

5. The network system of claim 4 wherein the index manager assigns higher priority feature groups to partitions of the first TCAM that have a lower TCAM index range and assigns lower priority feature groups to partitions of the first TCAM that have a higher TCAM index range.

6. The network system of claim 4 wherein the feature group manager further allows a feature that is applied on multiple ports of the network system to be represented by a single rule in the first TCAM.

7. The network system of claim 4 wherein, upon receiving the invocation of the unified API, the first TCAM manager:
   determines, based on the partitions allocated by the index manager, a particular partition in which the rule should be placed; and
   programs the rule into a free entry of the determined partition.

8. The network system of claim 1 wherein the one or more second hardware capabilities supported by the second TCAM include register-level access for programming the second TCAM.

9. The network system of claim 1 wherein the one or more second hardware capabilities supported by the second TCAM include API-level access for programming the second TCAM.

10. The network system of claim 1 wherein the first TCAM is designed by a different chip vendor than the second TCAM.

11. The network system of claim 1 wherein the network system is a mixed stacking system comprising one or more high-end stackable switches and one or more low-end stackable switches.

12. The network system of claim 1 wherein the network system is a modular chassis system comprising a plurality of line cards.

13. A method comprising:
   executing, by a network system comprising first and second ternary content-addressable memories (TCAMs), a first TCAM manager associated with the first TCAM and a second TCAM manager associated with the second TCAM,
   wherein the first TCAM supports one or more first hardware capabilities,
   wherein the second TCAM supports one or more second hardware capabilities that are not supported by the first TCAM, and
   wherein each of the first and second TCAM managers:
   exposes, to a network application running on the network system, a unified application programming interface (API) for programming a rule into its associated TCAM, the unified API being identical for the first and second TCAM managers; and
   upon receiving an invocation of the unified API from the network application, determines how to program the rule based on its associated TCAM's supported hardware capabilities.

14. The method of claim 13 wherein the first TCAM has a different size than the second TCAM.

15. The method of claim 13 wherein the one or more second hardware capabilities supported by the second TCAM include hardware-based prioritization of rules programmed into the second TCAM.

16. A non-transitory computer readable medium having stored thereon instructions executable by a processor of a network system, the network system comprising first and second ternary content-addressable memories (TCAMs), the first TCAM supporting one or more first hardware capabilities, the second TCAM supporting one or more second hardware capabilities that are not supported by the first TCAM, the instructions comprising:
   instructions that cause the processor to execute a first TCAM manager for the first TCAM and a second TCAM manager for the second TCAM,
   wherein each of the first and second TCAM managers:
   exposes, to a network application running on the network system, a unified application programming interface (API) for programming a rule into its associated TCAM, the unified API being identical for the first and second TCAM managers; and
   upon receiving an invocation of the unified API from the network application, determines how to program the rule based on its associated TCAM's supported hardware capabilities.

17. The non-transitory computer readable medium of claim 16 wherein the first TCAM has a different size than the second TCAM.

18. The non-transitory computer readable medium of claim 16 wherein the one or more second hardware capabilities supported by the second TCAM include hardware-based prioritization of rules programmed into the second TCAM.

\* \* \* \* \*